Patented Sept. 4, 1923.

1,467,104

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.   Application filed March 3, 1922. Serial No. 540,862.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Compositions, of which the following is a full, clear, and exact specification.

This invention relates to new compositions of matter in which cellulose ethers are mixed with other substances so that they can be advantageously used in the plastic and analogous arts, such, for example, as sheet or film or varnish manufacture.

One object of my invention is to provide compositions of increased utility in the plastic and analogous arts. Another object of my invention is to provide compositions which may be made into strong, flexible, transparent films, moulded articles, etc. Further objects will hereinafter appear.

I have discovered that a composition of matter having these desired characteristics can be obtained by mixing or compounding cellulose ether, say of the type indicated in U. S. Patent 1,188,376, Lilienfeld, June 20, 1916, with benzaldehyde. In the preferred forms of my invention I may add one or more of the following alkyl compounds: monohydroxy aliphatic alcohols of less than six carbon atoms, the acetates of such alcohols, acetone. While benzaldehyde by itself, is a useful solvent for film making I prefer to use with it, one or more volatile vehicles to carry the ingredients and control evaporation, such as ethyl alcohol, methyl alcohol, ethyl acetate, methyl acetate, acetone.

By way of illustration, I may dissolve cellulose ether, like water-insoluble ethyl cellulose, in benzaldehyde, say one part by weight of the ether to from 4 to 6 parts of the solvent. I prefer, however, to use from 90 to 10 parts of benzaldehyde mixed with from 10 to 90 parts of said alky compounds, such as methyl acetate. For instance, an excellent viscous film-making dope is prepared by dissolving one part by weight of said ethyl cellulose in from 4 to 6 (say 5) parts of a mixed solvent containing benzaldehyde and methyl acetate in equal proportions.

Other substances which impart useful qualities to the film may be added, if desired, such as tripenyl or tricresyl phosphate, camphor, monochlornaphthalene, etc. The ingredients are of the commercial type, sufficiently purified for the purpose in view. For film dopes, they are prepared to yield films of the proper relative freedom from color. Because of its relatively high boiling point enough benzaldehyde remains in the film to impart useful qualities thereto.

Having thus described my invention, what I claim as new and desire to secure by Letters Patent is:

1. A composition of matter comprising cellulose ether and benzaldehyde.

2. A composition of matter, comprising cellulose ether dissolved in benzaldehyde and a volatile vehicle carrying said ether and said benzaldehyde.

3. A composition of matter comprising cellulose ether, benzaldehyde and methyl acetate.

4. A composition of matter comprising cellulose ether dissolved in a mixture containing from 90 to 10 parts by weight of benzaldehyde and 10 to 90 parts of a volatile vehicle carrying said ingredients.

5. A viscous flowable composition comprising one part by weight of water-insoluble ethyl cellulose, and from 4 to 6 parts of a solvent containing benzaldehyde.

6. As an article of manufacture, a deposited or flowed film comprising cellulose ether and benzaldehyde.

7. As an article of manufacture, a deposited or flowed flexible film comprising water-insoluble ethyl cellulose and benzaldehyde.

Signed at Rochester, New York, this 27 day of February, 1922.

STEWART J. CARROLL.